US011964841B2

(12) United States Patent
Kimura

(10) Patent No.: US 11,964,841 B2
(45) Date of Patent: Apr. 23, 2024

(54) FEEDING APPARATUS AND PRINTING APPARATUS

(71) Applicant: CANON KABUSHIKI KAISHA, Tokyo (JP)

(72) Inventor: Yukimichi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 16/710,381

(22) Filed: Dec. 11, 2019

(65) Prior Publication Data

US 2020/0207564 A1 Jul. 2, 2020

(30) Foreign Application Priority Data

Dec. 28, 2018 (JP) ................................ 2018-248107

(51) Int. Cl.

*B65H 3/66* (2006.01)
*B65H 3/06* (2006.01)
*G03G 15/00* (2006.01)

(52) U.S. Cl.

CPC ............ *B65H 3/66* (2013.01); *B65H 3/0684* (2013.01); *G03G 15/6529* (2013.01)

(58) Field of Classification Search

CPC .......... B65H 3/34; B65H 3/66; B65H 3/0684; G03G 15/6529

See application file for complete search history.

(56) References Cited

U.S. PATENT DOCUMENTS 5,228,671 A * 7/1993 Fish ....................... B65H 31/36 271/119
6,375,183 B1 * 4/2002 Inoue ....................... B65H 3/54 271/167
7,108,259 B2 * 9/2006 Chang ................. B65H 3/0615 271/167

(Continued)

FOREIGN PATENT DOCUMENTS

JP 2000-289875 A 10/2000
JP 2014-065608 A 4/2014
JP 2017-124944 A 7/2017

OTHER PUBLICATIONS

Office Action dated Oct. 25, 2022, in Japanese Patent Application No. 2018-248107.

*Primary Examiner* — Patrick Cicchino
(74) *Attorney, Agent, or Firm* — Venable LLP

(57) ABSTRACT

A feeding apparatus includes a feeding roller that comes in contact with one of stacked printing media and feeds the printing medium; a support member that supports the feeding roller; an inclined portion that is arranged downstream of the feeding roller in a feeding direction in which the printing medium is fed, the inclined portion being inclined with respect to the stacked printing media; and a restriction member that is arranged downstream of the feeding roller in the feeding direction, the restriction member being capable of coming in contact with the printing medium fed by the feeding roller. The restriction member is provided independently from the support member and is capable of moving (Continued)

between a first position and a second position, the first position being set adjacent to a downstream region of the inclined portion in the feeding direction, the second position being set between the first position and the feeding roller with respect to the feeding direction.

21 Claims, 7 Drawing Sheets

(56) References Cited

U.S. PATENT DOCUMENTS

| | | | | |
|---|---|---|---|---|
| 8,313,097 | B2 * | 11/2012 | Kayama | B65H 3/34 271/117 |
| 9,073,715 | B2 | 7/2015 | Yokoi | |
| 9,242,817 | B2 * | 1/2016 | Suganuma | B65H 3/66 |
| 10,202,249 | B2 * | 2/2019 | Mitamura | B65H 3/66 |
| 10,329,107 | B2 * | 6/2019 | Yamamoto | B65H 3/0684 |

* cited by examiner

FEEDING APPARATUS AND PRINTING APPARATUS

BACKGROUND OF THE INVENTION

Field of the Invention

The present invention relates to a feeding apparatus that feeds a sheet-shaped printing medium and a printing apparatus.

Description of the Related Art

The publicly known feeding mechanism that feeds stacked sheet-shaped printing media is a feeding mechanism using a method called the inclined-surface separation method. In this method, the top one of printing media horizontally stacked in a feeding cassette is fed by a feeding roller such that the printing media are fed one by one with the top printing medium being separated from the rest of the printing media using an inclined portion provided downstream in the feeding direction.

In the inclined-surface separation method, a distortion may occur on the leading side of the printing medium in the feeding direction while the printing medium fed by the feeding roller comes in contact with the inclined portion and bends upward during conveyance. This is because bending orientations of portions of the printing medium while the printing medium comes in contact with the inclined portion and bends are different depending on the effect of the pressing force from the feeding roller on each portion of the printing medium.

Japanese Patent Laid-Open No. 2014-65608 (hereinafter referred to as PTL 1) discloses a technique for suppressing such a distortion that may occur in the feeding mechanism employing the inclined-surface separation method. According to PTL 1, restriction members are arranged in a position where the restriction members can come in contact with a surface of the printing medium while the printing medium is bent along an inclined portion during conveyance. The restriction members are provided to a support member supporting a feeding roller while being arranged and secured as a pair on the two sides of the feeding roller. The support member is displaced according to the stacking amount of the printing media. The restriction members are attached in a position where the restriction members do not come in contact with the printing medium before feeding by the feeding roller so as not to affect the drive force for feeding.

In order to restrict the distortion that occurs on the printing medium using the restriction members, it is required to attach the restriction members as close as possible to the inclined portion. However, with the configuration in which the restriction members are arranged and secured on the support member that is displaced according to the stacking amount of the printing media as disclosed in PTL 1, there is a possibility of failing in achievement of the effect proper for the relationship between the attachment position of the restriction members and the stacking number of the printing media.

For example, with a configuration in which the restriction members are attached so as not to come in contact with a small amount of the stacked printing media, the restriction members may be too far from the inclined surface if a medium amount or a large amount of the printing media are stacked, and thus the restriction members may not come in contact with the bent printing medium, and the restriction may not be achieved. On the other hand, with a configuration in which the restriction members are attached so as not to come in contact with a large amount of the stacked printing media, the restriction members may come in contact with the stacked printing media if the amount of the stacked printing media is small, and this may affect the drive force for feeding.

SUMMARY OF THE INVENTION

A feeding apparatus according to an aspect of the present invention includes: a feeding roller that comes in contact with one of stacked printing media and feeds the printing medium; a support member that supports the feeding roller; an inclined portion that is arranged downstream of the feeding roller in a feeding direction in which the printing medium is fed, the inclined portion being inclined with respect to the feeding direction; and a restriction member that is arranged downstream of the feeding roller in the feeding direction, the restriction member being capable of coming in contact with the printing medium fed by the feeding roller, in which the restriction member is provided independently from the support member and is capable of moving between a first position and a second position, the first position being set downstream of the inclined portion in the feeding direction, the second position being set upstream of the inclined portion.

Further features of the present invention will become apparent from the following description of exemplary embodiments with reference to the attached drawings.

DESCRIPTION OF THE EMBODIMENTS

Figure 1:
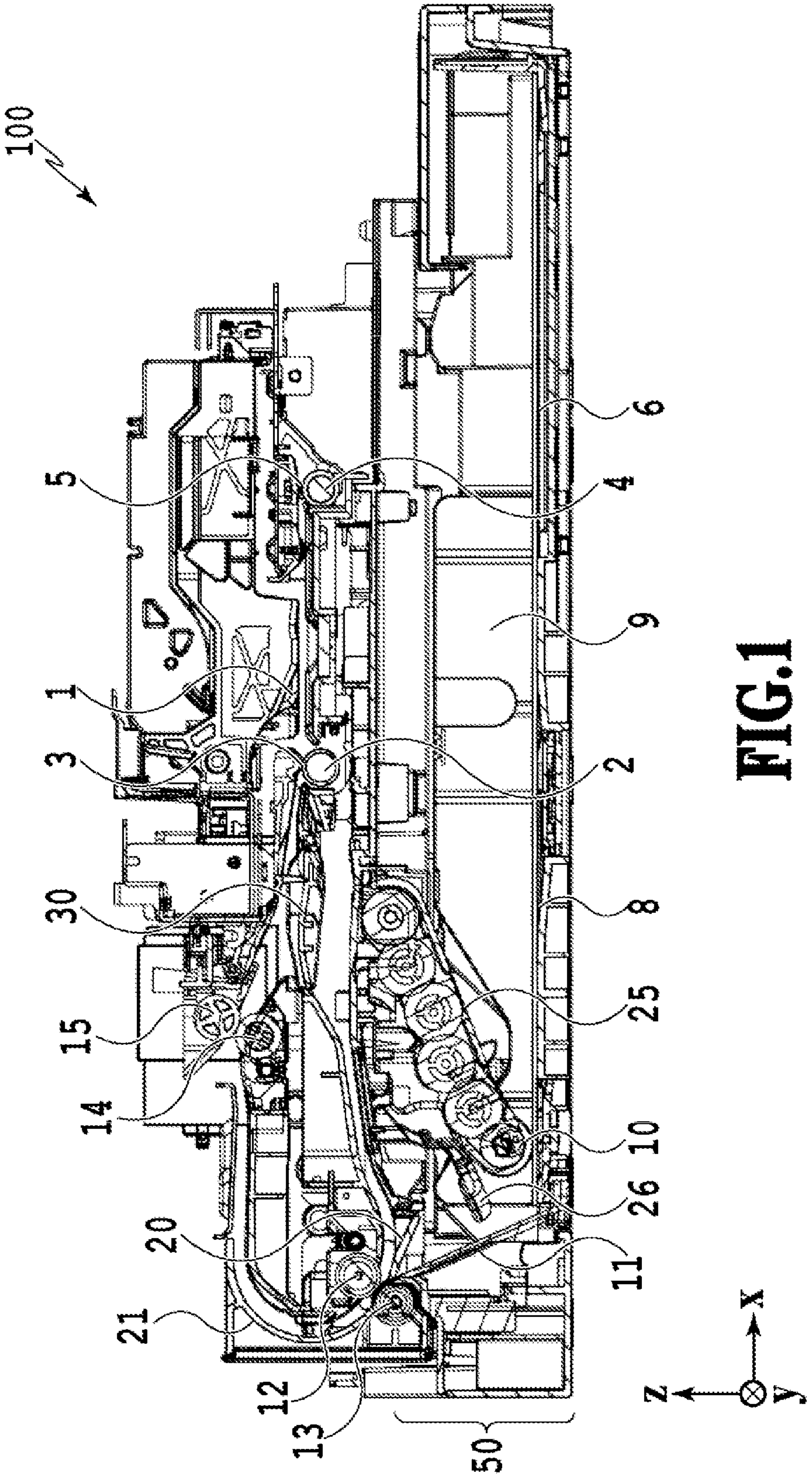
FIG. 1 is a schematic cross-sectional view illustrating a cross section of a part of a printing apparatus.

Embodiments of the present invention are described below with reference to the drawings. The following embodiments are not intended to limit the present invention, and all the combinations of the characteristics described in the embodiments are not necessarily required for the solution to the problem of the present invention. The same configurations are described using the same reference numerals. The relative arrangements, shapes, and the like of the constituents described in the embodiments are merely examples and are not intended to limit the scope of the invention thereto.

Embodiment 1

FIG. 1 is a cross-sectional view illustrating a part of a printing apparatus 100 according to this embodiment. The printing apparatus 100 illustrated in FIG. 1 includes a printing head 1 that performs printing by ejecting ink on a sheet-shaped printing medium. A first conveyance roller 2 and a first pinch roller 3 are provided upstream of the printing head 1 in the conveyance direction of the printing medium. The printing medium is conveyed to the printing head 1 by rotations of the first conveyance roller 2 and the first pinch roller 3 with the printing medium put between the first conveyance roller 2 and the first pinch roller 3. A delivery roller 4 and a delivery driven roller 5 are provided downstream of the printing head 1 in the conveyance direction of the printing medium. The printing medium on which printing is completed by the printing head 1 is put between the delivery roller 4 and the delivery driven roller 5 and is discharged by rotations of the delivery roller 4 and the delivery driven roller 5.

The printing apparatus 100 of this embodiment includes a stacking unit 6. The stacking unit 6 is arranged on the bottom of the printing apparatus 100 to store printing media 8. The stacking unit 6 is provided with printing medium guide members 9 that restrict a direction (hereinafter referred to as "the width direction of the printing medium" or simply as "the width direction") crossing the conveyance direction (the feeding direction) of the printing media 8. The printing medium guide members 9 are symmetrically arranged in the width direction so as to put the printing media 8 therebetween.

A feeding roller 10 is arranged on the downstream leading end of the stacking unit 6 in the feeding direction of the printing medium 8. The feeding roller 10 comes in contact with the top one of the printing media 8 stacked in the stacking unit 6 to feed the top printing medium 8. An inclined portion 11 is arranged downstream of the feeding roller 10 in the feeding direction of the printing medium. The inclined portion 11 includes an inclined surface that is inclined upward in the feeding direction of the printing medium fed by the feeding roller 10. The inclined portion 11 is used for bending upward and conveying each of the printing media 8 stacked in the stacking unit 6 and then fed by the feeding roller 10. The printing medium fed by the driving feeding roller 10 comes in contact with the inclined surface of the inclined portion 11 and is fed such that only the top printing medium is separated from the rest of the printing media.

A second conveyance roller 12 and a second pinch roller 13 are arranged above the inclined surface of the inclined portion 11 or downstream in the conveyance direction of the printing medium. Once the leading end of the printing medium 8 is moved on the inclined surface of the inclined portion 11 and reaches the second conveyance roller 12, the printing medium 8 is conveyed downstream in the conveyance direction by the second conveyance roller 12 and the second pinch roller 13 using a conveyance guide 21. The conveyed printing medium 8 is then further conveyed to a printing area in which the printing head 1 performs printing, by a third conveyance roller 14 and a third pinch roller 15 provided downstream in the conveyance direction. The second conveyance roller 12, the second pinch roller 13, the conveyance guide 21, the third conveyance roller 14, and the third pinch roller 15 form a first conveyance route for conveying the printing medium.

A first movable member 20 is provided between the feeding roller 10 and the second conveyance roller 12. The first movable member 20 is opened and closed by the leading end portion of the printing medium moved on the inclined surface of the inclined portion 11. A second movable member 30 that is opened and closed is provided between the third conveyance roller 14 and the first conveyance roller 2. The first conveyance roller 2, the first pinch roller 3, the second movable member 30, the first movable member 20, the second conveyance roller 12, and the second pinch roller 13 form a second conveyance route. The second movable member 30 guides the printing medium to the second conveyance route branch, while the first conveyance roller 2 is inversely rotated to convey the printing medium upstream in the conveyance direction from the printing area. For example, the second movable member 30 is used for duplex printing.

Restriction members 26 are provided downstream of the feeding roller 10 in the conveyance direction (the feeding direction). The restriction members 26 suppress occurrence of a distortion on the leading end of the printing medium in the feeding direction. A feeding apparatus 50 of this embodiment includes the stacking unit 6, the printing medium guide members 9, a support member 25, the feeding roller 10, the inclined portion 11, the first movable member 20, and the restriction members 26. Hereinafter, for easy understanding, a phenomenon that may occur if no restriction members are provided for the so-called inclined-surface separation method like this embodiment is described.

Description of Comparative Example

Figure 2:
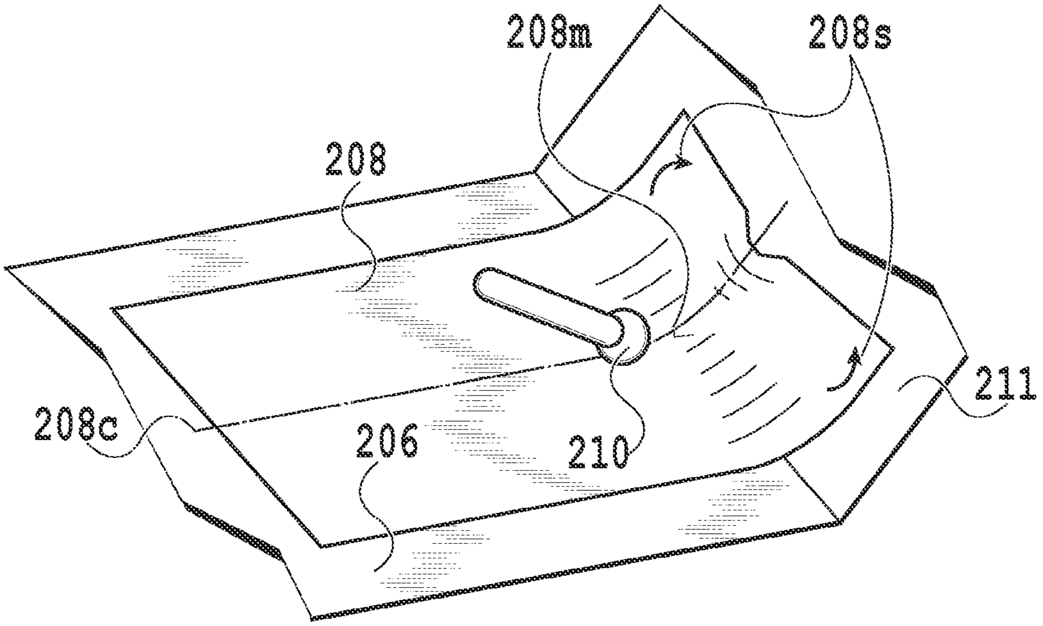
FIG. 2 is a diagram illustrating a configuration of a comparative example.

FIG. 2 is a diagram of a comparative example illustrating a schematic configuration of a feeding apparatus including no restriction members 26 illustrated in FIG. 1. In the so-called inclined-surface separation method, a printing medium 208 fed by a feeding roller 210 comes in contact with an inclined portion 211 and bends upward during conveyance. In this process, if no restriction members are provided as illustrated in FIG. 2, the printing medium 208 may be bent in a portion 208*m*, which is close to the bending portion of the printing medium 208 and is on the extension of the conveyance by the feeding roller 210. In this case, two end portions 208*s* on the leading end of the printing medium 208 in the feeding direction are distorted to be gathered to the center of the printing medium as indicated by the arrows.

Specifically, with the feeding roller 210 rotated while pressing a center portion 208*c* of the top one of the printing media 208 stacked in a stacking unit 206, the top printing medium 208 is conveyed in the feeding direction. Thereafter, the top printing medium 208 bends at the vicinity of the portion 208*m* as the printing medium 208 starts to ascend an inclined portion 211. At that time, the bending orientation of the vicinity of the center portion of the printing medium 208 (see the portion 208*m*) differs from the bending orientations of the two end portions of the printing medium 208 (see the portions 208*s*) due to the difference between the effects of the pressing force of the feeding roller 210 applied to the respective portions. Specifically, the vicinity of the center portion of the printing medium 208 bends in a position closer to an inclined surface of the inclined portion 211 than the two end portions of the printing medium 208. Once such a difference occurs between the bending orientations within a single printing medium 208, the center portion in the width direction of the leading end portion of the printing medium 208 in the feeding direction is distorted as illustrated in FIG. 2. Specifically, the center portion in the width direction of the leading end portion of the printing medium 208 comes off the inclined portion 211. This distortion phenomenon is likely to occur particularly in a printing medium such as thin paper with low rigidity. In addition, if the leading end portion of the printing medium having the distortion is pinched by a nip formed of a rubber portion of a conveyance roller and a pinch roller, this may cause wrinkles or a paper jam of the printing medium.

On the other hand, in the feeding apparatus 50 of this embodiment including the restriction members 26, the printing medium 8 comes in contact with the inclined portion 11 and starts bending. As the leading end portions of the restriction members 26 come in contact with the printing medium 8 at the beginning of the bending, it is possible to restrict the occurrence of the distortion of the printing medium that is illustrated in FIG. 2.

Description of Restriction by Restriction Members

Figure 3:
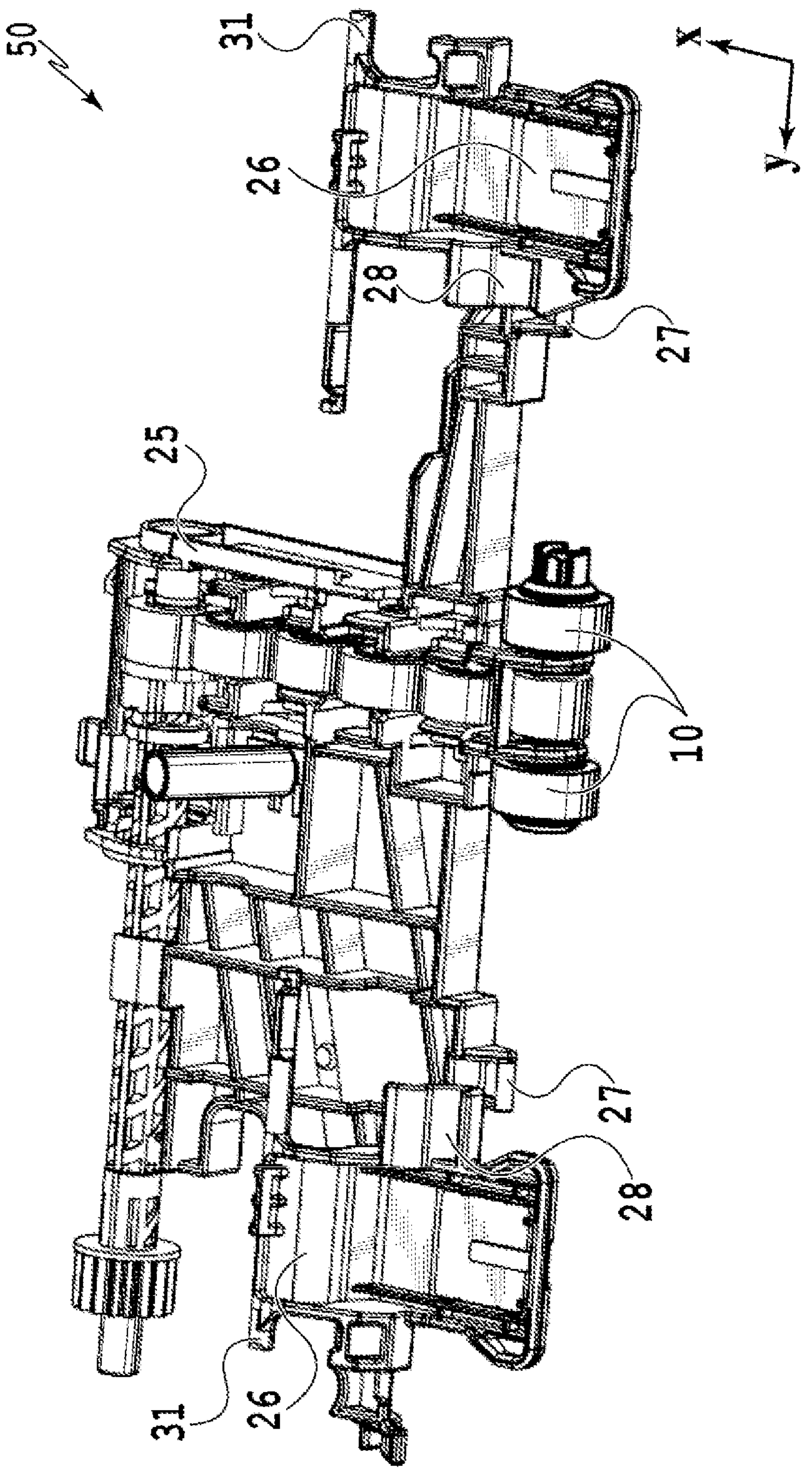
FIG. 3 is a perspective view of a configuration of an extracted part of a feeding apparatus of the printing apparatus.

FIG. 3 is a perspective view of a configuration of an extracted part of the feeding apparatus 50 provided in the printing apparatus 100 illustrated in FIG. 1. As illustrated in FIG. 3, the feeding apparatus 50 of this embodiment includes the support member 25 for supporting the feeding roller 10. The support member 25 is also referred to as a swing arm. The feeding roller 10 is positioned downstream of the support member 25 in the feeding direction of the printing medium and is supported at the center portion of the support member 25 in a direction crossing the feeding direction (the width direction of the printing medium).

The pair of restriction members 26 are formed independently from the support member 25 and are arranged to be away from each other in the width direction of the printing medium with the feeding roller 10 put therebetween. That is, the restriction members 26 of this embodiment are not provided integrally with the support member 25. The support member 25 includes engagement surfaces 27 (engagement portions) to be brought into contact and engaged with the restriction members 26.

The support member 25 is configured to move in the vertical direction. For example, the support member 25 moves in the vertical direction according to the amount of the printing media 8 stacked in the stacking unit 6. The engagement surfaces 27 move along with the movement of the support member 25. In this embodiment, the engagement surfaces 27 are movable while being engaged with the restriction members 26 formed independently from the support member 25. More specifically, the restriction members 26 are moved along with the movement of the support member 25 while surfaces of the restriction members 26 engaged with the engagement surfaces 27 are changed by the movement of the engagement surfaces 27. In other words, the positions of the restriction members 26 are changed (the restriction members 26 are displaced) according to the positions of the movement trace of the support member 25. In this embodiment, the pair of restriction members 26 are arranged symmetrically about the feeding roller 10 in areas around the two ends of the printing medium in the width direction. The restriction members 26 are arranged so that the restriction members 26 can come in contact with the areas around the two ends of the printing medium in the width direction during conveyance.

Figure 4A:
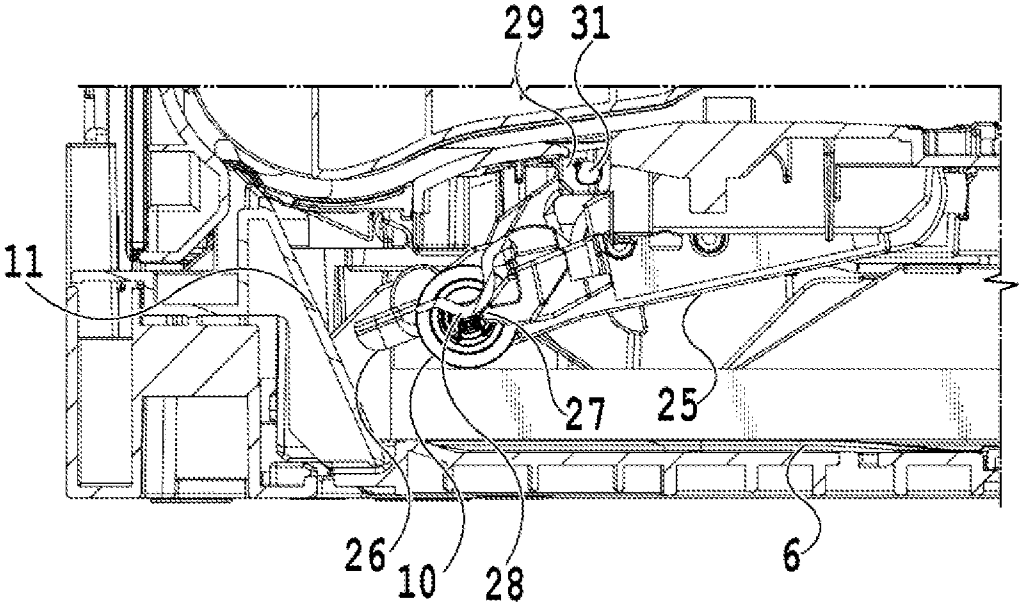
FIGS. 4A and 4B are schematic cross-sectional views of the feeding apparatus including restriction members.
Figure 4B:
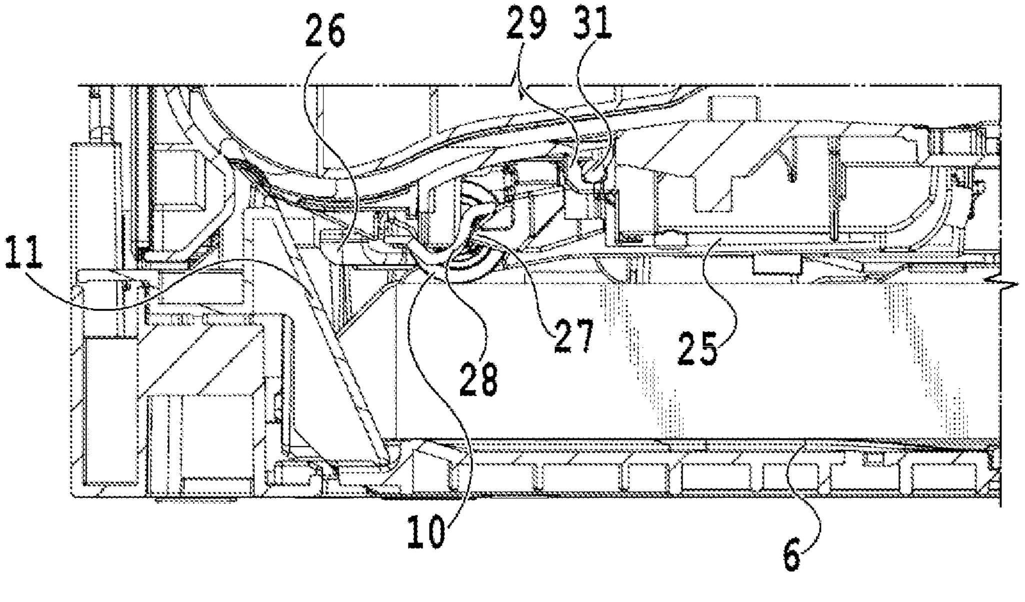

FIGS. 4A and 4B are schematic cross-sectional views illustrating that a member including the restriction members 26 illustrated in FIG. 3 is arranged inside the printing apparatus. FIG. 4A illustrates that a first amount (a medium amount) of the printing media are stacked in the stacking unit 6. On the other hand, FIG. 4B illustrates that a second amount (a large amount), which is more than the first amount, of the printing media are stacked in the stacking unit 6. For example, in a case in which the thickness of each printing medium is 0.1 mm, the first amount illustrated in FIG. 4A is about 100 sheets (10 mm of height), and the second amount illustrated in FIG. 4B is about 250 sheets (25 mm of height).

In this embodiment, the support member 25 is configured to be capable of rising and falling depending on the stacking number (the stacking amount) of the printing media stacked in the stacking unit 6 so that the feeding roller 10 can come in contact with the top printing medium 8. The restriction members 26 include cam surfaces 28 (contact portions) that can come in contact with the engagement surfaces 27 of the support member 25. As the engagement surfaces 27 are moved along with the rising and falling of the support member 25, the engagement surfaces 27 are engaged with the cam surfaces 28, and thus the restriction members 26 rise and fall similarly as the feeding roller 10 does.

As illustrated in FIGS. 3, 4A, and 4B, the restriction members 26 each include a shaft portion 31. The shaft portion 31 is arranged on a bearing 29 formed independently from the support member 25. As the support member 25 is moved, the positions of the cam surfaces 28 engaged with the engagement surfaces 27 of the support member 25 are changed. In this process, the positions of the restriction members 26 in the vertical direction are changed with the restriction members 26 pivoting about the shaft portions 31. The cam surfaces 28 of the restriction members 26 of this embodiment each have a cam shape formed to set the restriction members 26 in a position where the restriction members 26 come in contact with the printing medium near the inclined portion 11 upstream of the feeding roller 10 in the feeding direction irrespective of the stacking number of the printing media stacked in the stacking unit 6. In other words, the cam shape of the cam surface 28 is formed such that the distance between the leading end portions of the restriction members 26 extending in the feeding direction of the printing medium and the inclined portion 11 positioned on the extension of the extending direction falls within a predetermined range. For example, a position in which the restriction members 26 are positioned downstream of the inclined portion 11 in the feeding direction is a first position, while a position in which the restriction members 26 are positioned upstream of the inclined portion 11 in the feeding direction, which is upstream of the first position, is a second position. That is, the first position is a position higher than the second position in the vertical direction. The restriction members 26 are formed such that the distance between the leading end portions of the restriction members 26 extending in the feeding direction of the printing medium and the inclined portion 11 positioned on the extension of the extending direction falls within the predetermined range in both the cases of the first position and the second position. With this configuration, the restriction members 26 function so as to suppress occurrence of the bending and distortion of the printing medium irrespective of the stacking number of the printing media. This embodiment is further useful in a printing apparatus for feeding a large amount of media.

As illustrated in FIGS. 4A and 4B, in this embodiment, the portions of the restriction members 26 to be brought into contact with the top surface of the stacked printing media do not come in contact with the printing medium before feeding. However, the restriction members 26 may be in a position on substantially the same plane as that of the position in which the feeding roller 10 comes in contact with the top printing medium. This is because, in this embodiment, the drive force during feeding is not affected although the restriction members 26 are in the position on substantially the same plane as that of the position in which the feeding roller 10 comes in contact with the top printing medium. If the restriction members are formed integrally with the support member 25 and the restriction members press the printing medium, the reaction force from the printing medium is transmitted to the support member 25 supporting the feeding roller 10 through the integral restriction members, and thus the drive force during feeding is affected. However, in this embodiment, as illustrated in FIGS. 4A and 4B, the shaft portions 31 of the restriction members 26 are arranged on the bearings 29 formed independently from the support member 25. Consequently, although the restriction members 26 press the printing medium, the reaction force is not transmitted to the support member 25 through the restriction members 26, and thus the drive force during feeding is not affected.

As described above, during feeding, the restriction members 26 may be positioned on substantially the same plane as that of the position where the feeding roller 10 comes in contact with the top printing medium. Even in this case, irrespective of the stacking number of the stacked printing media, the restriction members 26 come in contact with the top printing medium as the feeding roller 10 does and function so as to suppress occurrence of the bending and distortion of the printing medium.

Figure 5A:
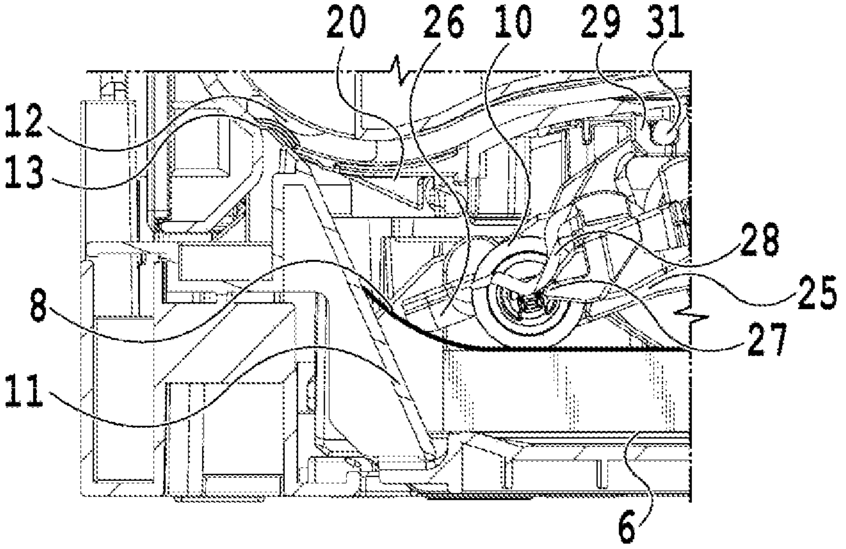
FIGS. 5A, 5B, and 5C are schematic cross-sectional views of the feeding apparatus illustrating orientations of the restriction members.
Figure 5B:
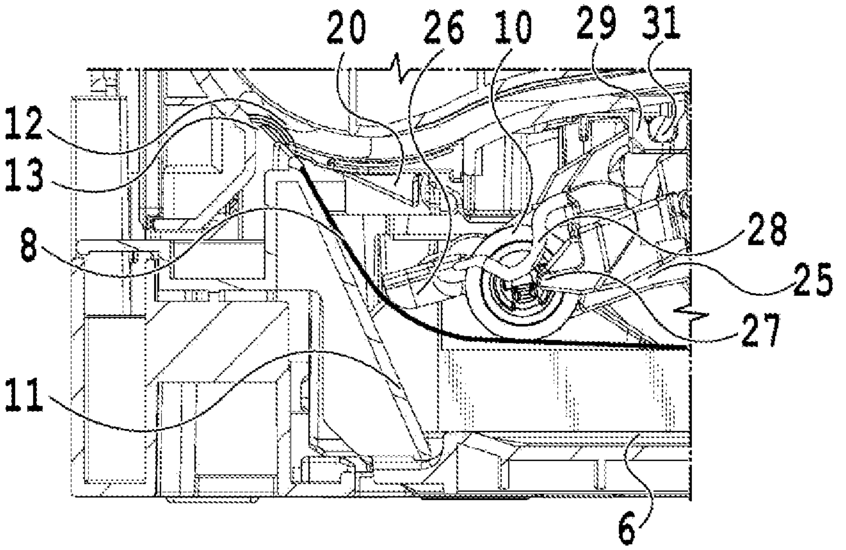
Figure 5C:
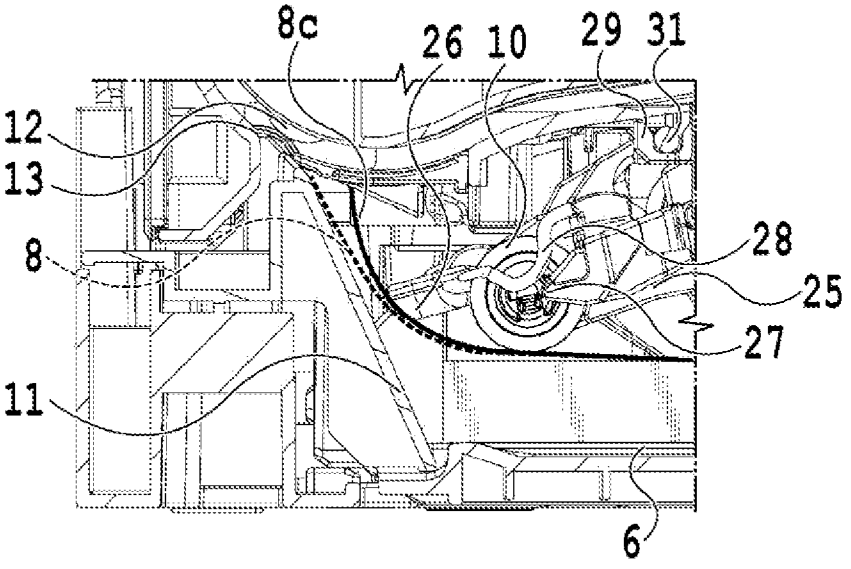

FIGS. 5A, 5B, and 5C are schematic cross-sectional views illustrating orientation examples of the restriction members 26 depending on states of the printing medium during feeding. FIG. 5A is a diagram illustrating that the printing medium 8 started to be fed by the feeding roller 10 reaches the inclined portion 11 and then comes in contact with the restriction members 26. FIG. 5B illustrates after the state of FIG. 5A that the leading end of the printing medium reaches the first movable member 20.

As illustrated in FIGS. 5A and 5B, the leading end of the top printing medium 8 fed by the feeding roller 10 comes in contact with the inclined portion 11 and starts bending, and is then conveyed toward the first movable member 20 while bending. In this process, the restriction force of the restriction members 26 affecting the printing medium is applied by the self-weight of the restriction members 26, and the leading end portions of the restriction members 26 in contact with the printing medium 8 restrict occurrence of the distortion of the printing medium 8. As illustrated in FIG. 5B, if the rigidity of the bent printing medium 8 is too high for the self-weight of the restriction members 26, the restriction members 26 are raised in a direction to be away from the inclined portion 11. In this case, the engagement surfaces 27 of the support member 25 and the restriction members 26 are away from each other. The restriction force can be adjusted by increasing the self-weight of the restriction members 26 or adding another bias member, and thus the restriction force can correspond to the type of the printing medium.

In this embodiment, the restriction members 26 are configured to be able to press down the vicinities of the end portions of the printing medium in the width direction. Specifically, the pair of restriction members 26 are arranged in the width direction of the printing medium with the feeding roller 10 put therebetween. That is, in this embodiment, two restriction members 26 are arranged in the width direction of the printing medium. However, even in a mode of arranging one restriction member 26 extending in the width direction of the printing medium, it is possible to press down the vicinities of the two ends of the printing medium in the width direction of the printing medium.

Description of First Movable Member

As described above, the restriction force required for the printing media 8 is different depending on the rigidity of the printing media, and is also different depending on the environment such as the temperature and humidity around the feeding apparatus. That is, the restriction by the restriction members 26 may not be sufficiently achieved depending on the variation of the surrounding environment in some cases. FIG. 5C is a diagram illustrating that the leading end of a printing medium 8*c* reaches the first movable member 20, the printing medium 8*c* indicating that the vicinity of the center portion of the printing medium 8 is bent and distorted. In the case in which the restriction by the restriction members 26 is not sufficiently achieved, the center portion in the width direction in the leading end of the printing medium 8 in the feeding direction may be distorted as illustrated in FIG. 2.

The configuration of this embodiment functions so as to correct the distortion even if the bending and distortion that may occur due to variation of the surrounding environment occur in the printing medium of low rigidity. Specifically, as illustrated in FIG. 5C, the first movable member 20 forms a guide surface shape inclined to make an acute angle with the first conveyance route. In other words, the first movable member 20 includes the inclined guide surface that is converged toward the downstream of the inclined portion 11 in the feeding direction. In the case in which the restriction force by the restriction members 26 does not sufficiently work on the printing medium 8*c*, the printing medium 8*c* ascends the inclined portion 11 with the vicinity of the center portion being bent and distorted as illustrated in FIG. 5C. In this case, the leading end of the printing medium 8*c* in the feeding direction leaves the inclined portion 11 and comes in contact with the first movable member 20. Meanwhile, the first movable member 20 forms the guide surface shape inclined to make the acute angle with the first conveyance route so that the leading end of the printing medium 8*c* can be smoothly conveyed to the first conveyance route. Consequently, the bending and distortion of the vicinity of the center portion of the printing medium 8 in the width direction are restricted with the leading end of the printing medium 8*c* in the feeding direction being in contact with the guide surface of the first movable member 20, and the leading end of the printing medium 8*c* in the feeding direction is thus conveyed in the direction toward the first conveyance route with the distortion corrected. That is, since the bending and distortion of the vicinity of the center portion of the printing medium 8 in the width direction are restricted upstream of the second conveyance roller 12 and the second pinch roller 13 in the feeding direction, which are downstream of the inclined portion 11 in the feeding direction, it is possible to suppress formation of wrinkles and paper jam of the printing medium.

In this embodiment, there is indicated the mode in which the first movable member 20 forms the guide surface shape inclined to make the acute angle between the vicinity of the center portion of the printing medium in the width direction and the first conveyance route; however, it is not limited thereto. The first movable member 20 may form a guide surface shape inclined to make an acute angle between the entire portion of the printing medium in the width direction and the first conveyance route.

As described above, in this embodiment, even if the vicinity of the center portion of the printing medium 8 in the width direction is likely to be bent and distorted due to variation of the surrounding environment, it is possible to achieve smooth conveyance by the first movable member 20.

<Description of Printing Medium Guide Members>

Figure 6A:
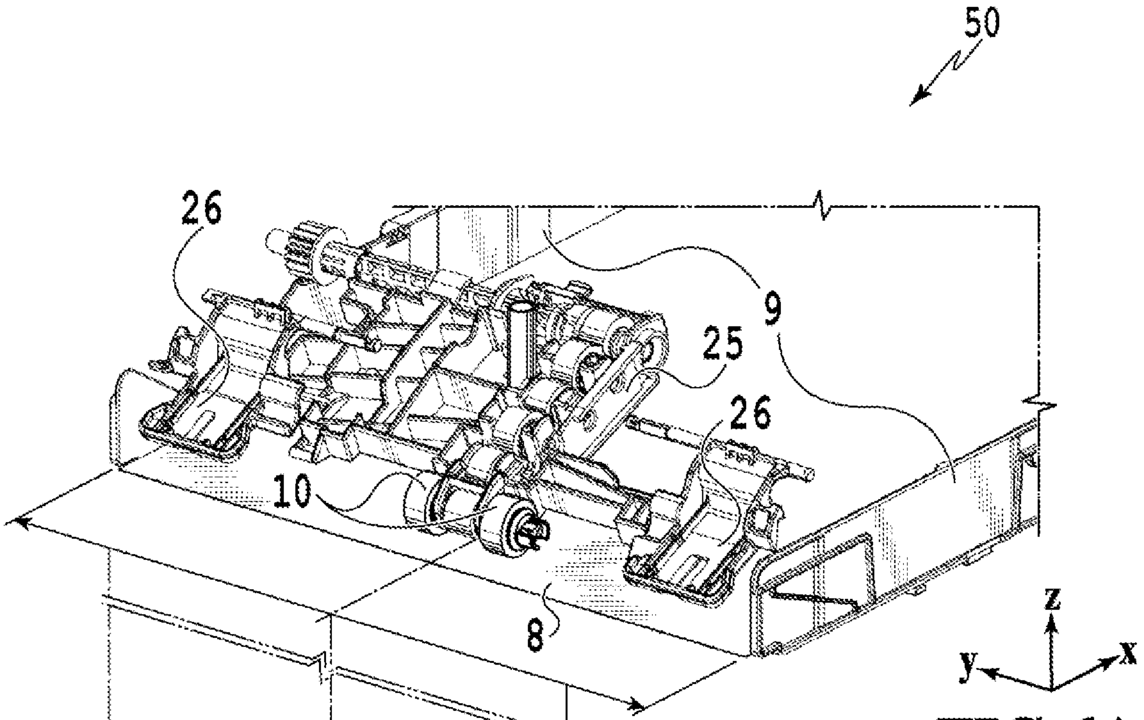
FIGS. 6A and 6B are schematic perspective views describing a relationship between the restriction members and printing medium guide members.
Figure 6B:
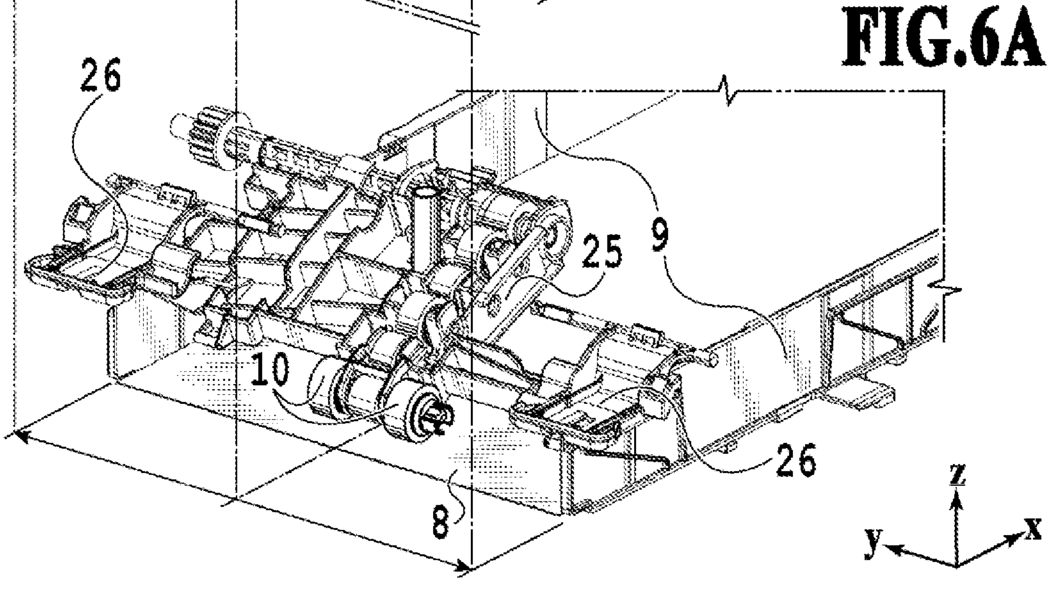

FIGS. 6A and 6B are schematic perspective views of the feeding apparatus 50 describing a relationship between the restriction members 26 and the printing medium guide members 9. In this embodiment, the restriction members 26 may either be applied or not applied depending on the size (the size in the width direction) of the printing media 8. Specifically, the restriction members 26 are applied if the size of the printing media 8 is large and are not applied if the size of the printing medium 8 is small. FIG. 6A illustrates that the size of the stacked printing media 8 is large and the restriction members 26 are applied. FIG. 6B illustrates that the size of the stacked printing media 8 is small and the restriction members 26 are retracted and not applied.

As illustrated in FIGS. 6A and 6B, the printing medium guide members 9 of this embodiment are positioned on outer sides of the width of the printing medium 8. The printing medium guide members 9 are a pair of guide members in which the distance thereof in the width direction of the printing medium is changed according to the size of the printing media stacked in the stacking unit 6. For example, in the case in which a user changes the type (the size) of the printing media, the positions of the printing medium guide members 9 are changed by sliding the printing medium guide members 9 in the width direction (the y direction) of the printing media. In this embodiment, the position of the restriction members 26 in the vertical direction while the maximum number of the printing media are stacked is lower than the position of the top portions of the printing medium guide members 9 in the vertical direction. Consequently, in the case in which the positions of the restriction members 26 and the printing medium guide members 9 coincide with each other in plan view, the restriction members 26 and the printing medium guide members 9 come in contact with each other.

In this embodiment, in the case in which the size of the printing media 8 is large, the restriction members 26 are positioned inward of the printing medium guide members 9 toward the center portion in the width direction as illustrated in FIG. 6A. Thus, the printing medium guide members 9 and the restriction members 26 do not come in contact with each other and can apply the function of the restriction members 26.

On the other hand, in the case in which the size of the printing media 8 is small, the restriction members 26 are positioned directly above the printing medium guide members 9 as illustrated in FIG. 6B. Thus, the printing medium guide members 9 and the restriction members 26 come in contact with each other, and the restriction members 26 are retracted upward by the printing medium guide members 9.

Figure 7A:
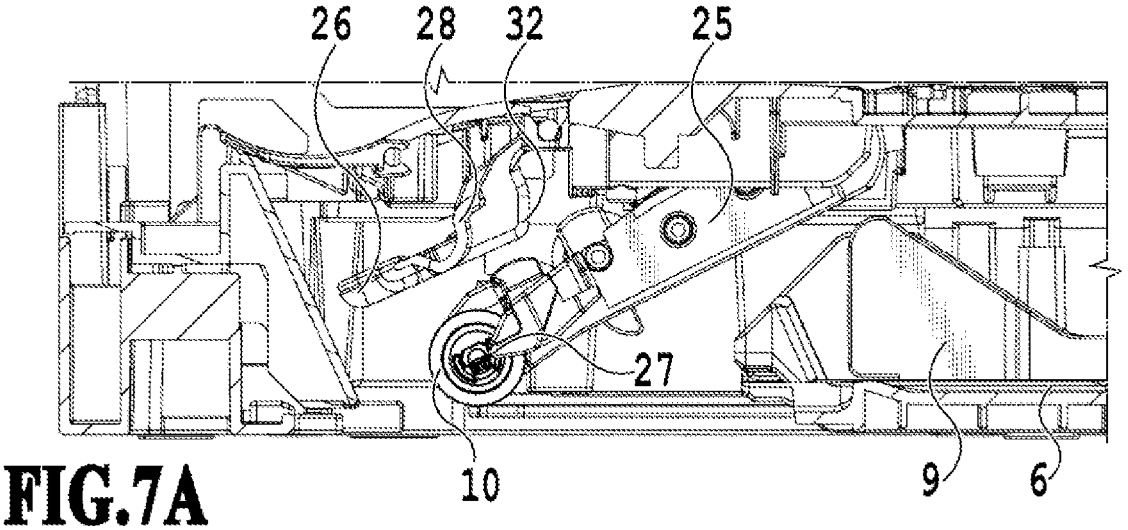
FIGS. 7A, 7B, and 7C are schematic cross-sectional views describing a positional relationship between the printing medium guide members and the restriction members.
Figure 7B:
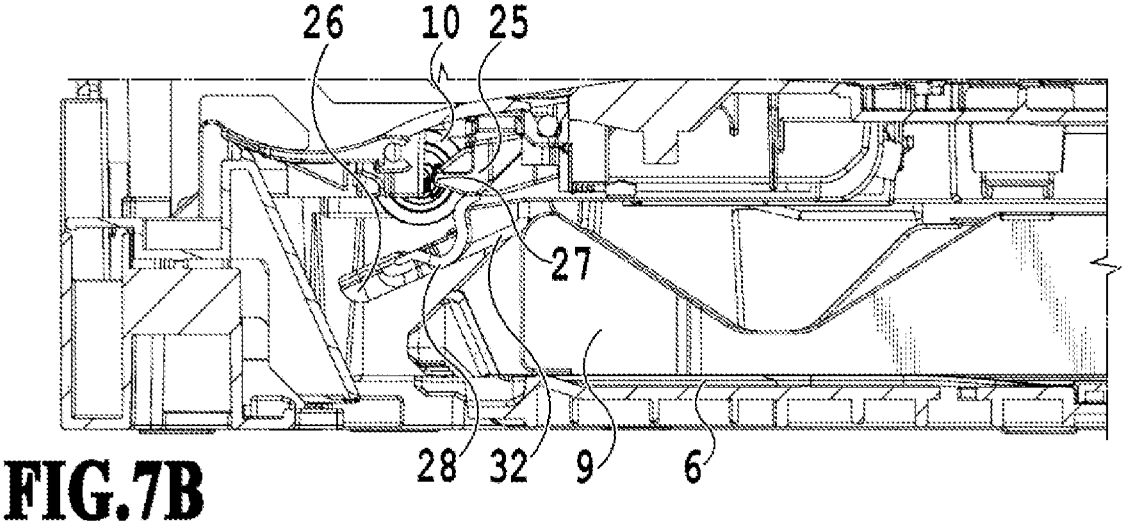
Figure 7C:
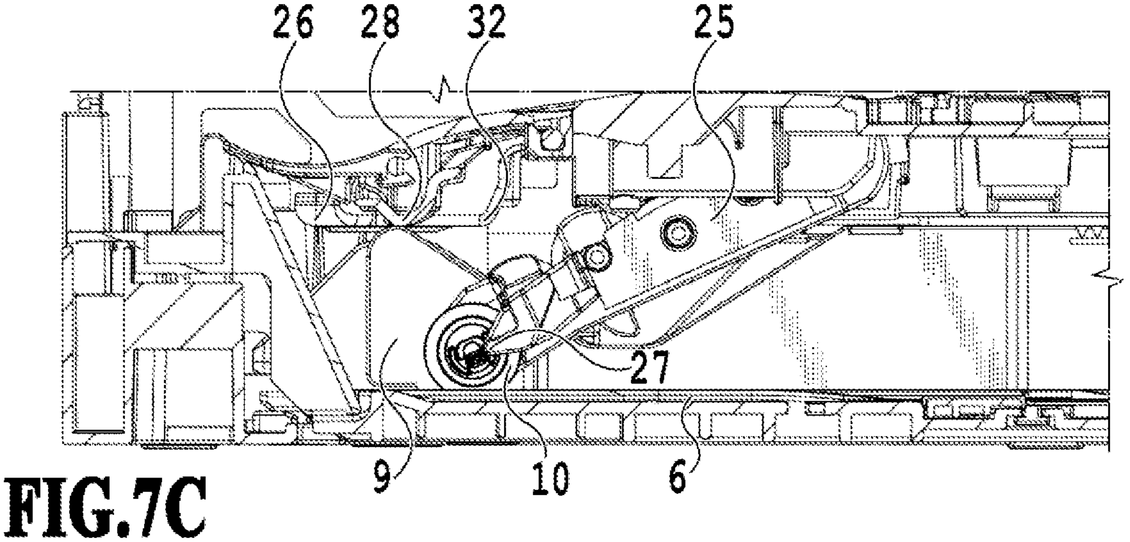

FIGS. 7A, 7B, and 7C are schematic cross-sectional views describing a positional relationship between the printing medium guide members 9 and the restriction members 26 in the case in which the size of the printing media 8 is small as illustrated in FIG. 6B. FIG. 7A is a diagram illustrating that the printing medium guide members 9 and a part of the stacking unit 6 are drawn by the user to the upstream side of the printing apparatus 100 (the right side in FIG. 1). In this case, the user slides the printing medium guide members 9 in the width direction of the printing medium to adjust the size in the width direction. In this example, the printing medium guide members 9 are slid to positions corresponding to the small size. The user then pushes back the printing medium guide members 9 and the part of the stacking unit 6.

FIGS. 7B and 7C are diagrams illustrating that the drawn printing medium guide members 9 and part of the stacking unit 6 are pushed back into the printing apparatus 100. As illustrated in FIG. 7B, the support member 25 is retracted upward while pushing back the printing medium guide members 9. In this process, the cam surfaces 28 of the restriction members 26 are detached from the engagement surfaces 27 of the support member 25, and the support member 25 is retracted upward independently from the restriction members 26. In the state of FIG. 7B, the printing medium guide members 9 come in contact with support surfaces 32 of the restriction members 26. Thereafter, once the printing medium guide members 9 are further inserted in the left direction of FIG. 7B, the state illustrated in FIG. 7C is made. That is, the support surfaces 32 of the restriction members 26 are held by the printing medium guide members 9. Meanwhile, the support member 25 moves downward to come in contact with the top printing medium 8. As described above, the configuration does not allow the support member 25 and the restriction members 26 to come in contact with each other if the size of the printing media is small. In addition, in the case in which the support surfaces 32 of the restriction members 26 are held by the printing medium guide members 9 as illustrated in FIG. 7C, the configuration does not allow the cam surfaces 28 and the engagement surfaces 27 to be engaged with each other since the cam surfaces 28 are positioned higher than the movement trace of the engagement surfaces 27 of the support member 25.

In general, the bending and distortion state of the vicinity of the center portion of the printing medium 8 is different depending on the size of the printing media in the width direction. Specifically, the distortion is not likely to occur in the small size but is likely to occur in the large size. That is, if the size of the printing media 8 is small, there may be no need to apply the restriction members 26 in some cases. According to the configuration of this embodiment, in the case in which the size of the printing media 8 is small, it is unnecessary to apply the restriction members 26 to the printing medium 8 irrespective of the stacking number. Consequently, it is possible to avoid, for example, application of a graze trace on particularly a mill finish surface of the small printing medium due to extra contact between the restriction members 26 and the printing medium.

OTHER EMBODIMENTS

The mode in which the printing head 1 performs printing is described as an example in the above-described embodiments; however, the type of the printing apparatus 100 is not limited thereto. The present invention may be applied to a printing apparatus that performs printing without using a printing head. For example, the above-described feeding apparatus may be mounted in an electrophotographic printing apparatus.

According to the present disclosure, it is possible to suppress the distortion of a printing medium fed by a feeding roller and bent by an inclined portion, without affecting the drive force for the feeding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248107, filed Dec. 28, 2018, which is hereby incorporated by reference herein in its entirety.

What is claimed is:

1. A feeding apparatus, comprising:

a feeding roller that comes in contact with one of stacked printing media on a stacking unit and feeds the printing medium in a feeding direction;

a support member that movably supports the feeding roller and includes an engagement portion;

an inclined portion that is arranged downstream of the feeding roller in the feeding direction, the inclined portion being inclined with respect to the stacking unit; and a restriction member that is capable of coming in contact with the printing medium at a downstream side of the feeding roller in the feeding direction and includes a contact portion to be engaged with the engagement portion of the support member, wherein the restriction member moves between a first position and a second position, the first position being set adjacent to a downstream region of the inclined portion in the feeding direction, the second position being set between the first position and the feeding roller with respect to the feeding direction, wherein the engagement portion moves the restriction member according to a stacking amount of the printing media stacked in the stacking unit by engaging with the contact portion, and wherein when the restriction member moves toward the first position by coming in contact with the printing medium fed by the feeding roller, engagement of the contact portion and the engagement portion is disengaged.

2. The feeding apparatus according to claim 1, wherein the restriction member is moved from the first position to the second position by displacement of the feeding roller and the support member as a function of a decrease of a stacking amount of the printing medium.

3. The feeding apparatus according to claim 1, wherein the restriction member includes a shaft portion supported by a bearing independent from the support member, and the restriction member moves from the first position to the second position by pivoting about the shaft portion.

4. The feeding apparatus according to claim 1, wherein the contact portion has a cam shape formed such that, between the first position and the second position, a distance between a leading end portion of the restriction member extending in the feeding direction of the printing medium and the inclined portion falls within a predetermined range.

5. The feeding apparatus according to claim 1, wherein during feeding of the top one of the stacked printing media by the feeding roller, in a vertical direction, the restriction member is positioned in substantially the same position in which the feeding roller comes in contact with the printing medium or positioned higher than the position in which the feeding roller comes in contact with the printing medium.

6. The feeding apparatus according to claim 1, wherein the restriction member includes a pair of restriction members arranged in symmetric positions about the feeding roller in a direction crossing the feeding direction of the printing medium.

7. The feeding apparatus according to claim 6, wherein the pair of restriction members are separated from each other.

8. The feeding apparatus according to claim 1, further comprising:

a movable member that is opened by a leading end of the printing medium and is arranged adjacent the downstream region of the inclined portion in the feeding direction, wherein the movable member includes a guide surface in an area corresponding to a vicinity of a center portion of the printing medium in a direction crossing the feeding direction.

9. The feeding apparatus according to claim 8, wherein the guide surface is an inclined surface converged toward the downstream region of the inclined portion in the feeding direction.

10. The feeding apparatus according to claim 1, wherein the restriction member is provided independently from the support member.

11. A feeding apparatus, comprising:

a feeding roller that comes in contact with one of stacked printing media on a stacking unit and feeds the printing medium in a feeding direction;

a support member that supports the feeding roller;

an inclined portion that is arranged downstream of the feeding roller in the feeding direction, the inclined portion being inclined with respect to the stacking unit; and a restriction member that is capable of coming in contact with the printing medium at a downstream side of the feeding roller in the feeding direction, wherein the restriction member moves between a first position and a second position, the first position being set adjacent to a downstream region of the inclined portion in the feeding direction, the second position being set between the first position and the feeding roller with respect to the feeding direction, and the restriction member is capable of being retracted to a third position, which is different from either the first position or the second position, depending on a size of the printing medium in a width direction crossing the feeding direction.

12. The feeding apparatus according to claim 11, wherein in a state in which the restriction member is retracted in the third position, the restriction member is not displaced by displacement of the feeding roller and the support member according to the stacking amount of the printing media.

13. The feeding apparatus according to claim 11, wherein the restriction member is moved to the third position and held by a printing medium guide member that restricts the printing medium in the width direction.

14. A printing apparatus, comprising:

a feeding roller that comes in contact with one of stacked printing media on a stacking unit and feeds the printing medium in a feeding direction;

a printing unit configured to perform printing on the printing medium fed by the feeding roller;

a support member that movably supports the feeding roller and includes an engagement portion;

an inclined portion that is arranged downstream of the feeding roller in the feeding direction, the inclined portion being inclined with respect to the stacking unit; and a restriction member that is capable of coming in contact with the printing medium at a downstream side of the feeding roller in the feeding direction and includes a contact portion to be engaged with the engagement portion of the support member, wherein the restriction member moves between a first position and a second position, the first position being set adjacent to a downstream region of the inclined portion in the feeding direction, the second position being set between the first position and the feeding roller with respect to the feeding direction, wherein the engagement portion moves the restriction member according to a stacking amount of the printing media stacked in the stacking unit by engaging with the contact portion, and wherein when the restriction member moves toward the first position by coming in contact with the printing medium fed by the feeding roller, engagement of the contact portion and the engagement portion is disengaged.

15. The printing apparatus according to claim 14, wherein the restriction member is moved from the first position to the second position by displacement of the feeding roller and the support member as a function of a decrease of a stacking amount of the printing medium.

16. The printing apparatus according to claim 14, wherein the restriction member includes a shaft portion supported by a bearing independent from the support member, and the restriction member moves from the first position to the second position by pivoting about the shaft portion.

17. The printing apparatus according to claim 14, wherein during feeding of the top one of the stacked printing media by the feeding roller, in a vertical direction, the restriction member is positioned in substantially the same position in which the feeding roller comes in contact with the printing medium or positioned higher than the position in which the feeding roller comes in contact with the printing medium.

18. The printing apparatus according to claim 14, wherein the restriction member includes a pair of restriction members arranged in symmetric positions about the feeding roller in a direction crossing the feeding direction of the printing medium.

19. The printing apparatus according to claim 18, wherein the pair of restriction members are separated from each other.

20. The printing apparatus according to claim 14, wherein the restriction member is provided independently from the support member.

21. The printing apparatus according to claim 14, wherein the printing unit includes a printing head that ejects ink on the printing medium.

* * * * *